LOOP CONTROL SYSTEM FOR TAPE TRANSPORTS

Filed April 17, 1963 2 Sheets-Sheet 1

INVENTOR.
HAROLD A. KURTH

BY *Robert G. Clay*

ATTORNEY

INVENTOR.
HAROLD A. KURTH
BY Robert G. Clay
ATTORNEY

United States Patent Office 3,319,901

Patented May 16, 1967

3,319,901

LOOP CONTROL SYSTEM FOR TAPE TRANSPORTS

Harold A. Kurth, Woodland Hills, Calif., assignor to Ampex Corporation, Redwood City, Calif., a corporation of California Filed Apr. 17, 1963, Ser. No. 273,681

11 Claims. (Cl. 242—55.12)

This invention relates to tape transport systems, and more particularly to systems for controlling the movement of a tape which is required to be driven bidirectionally and in various modes.

Digital tape transport systems are required to operate in ways which are consistent and compatible with associated electronic data processing systems. As a primary requirement, they must provide data at sufficiently high transfer rates to assure smooth and continuous data flow within the capabilities of associated buffering equipment. Therefore, the binary or other data recorded on the magnetic tape must be densely packed and the tape must move at relatively high rates of speed e.g. 75 to 150 inches per second. The data processing system, of course, does not demand or utilize the data recorded by the tape recording system in a continuous fashion, but may require different blocks of information intermittently, and may supply different blocks of information to be recorded intermittently. Accordingly, computer systems usually operate in particular formats designed for best cooperation with magnetic tape transport systems, and keep blocks of information separate with adequate space between them to permit tapes to be started and stopped. In addition, the data processing systems can very often operate to receive or provide a block of information in ascending or descending order, so that the tape transport must operate with like characteristics in either direction of tape movement. What is discussed here with respect to magnetic tape, of course, similarly applies to other recording media, such as electrostatic tape, thermoplastic tape, and paper tape, although the magnetic tape art is most fully advanced at this time and it will be understood that similar considerations apply to other such systems without further mention.

High performance magnetic tape transport systems for digital applications must therefore operate upon command in either the forward or reverse direction and must accelerate and decelerate the tape in minimum time. It is desirable to bring a tape to full speed within a fraction of an inch and within a relatively few milliseconds after provision of a start command and to stop the tape in a similar fashion. If this is not done, of course, large inter-record gaps must be provided for, the data density on the tape is decreased, and the utilization of a costly computer is decreased.

High speed tape starting and driving mechanisms and tape stopping mechanisms have accordingly been developed to meet these requirements, and in each instance require some sort of isolation of the relatively slower acting supply and take-up reels. Accordingly, low inertia compliance mechanisms are usually interposed between the driving mechanism and the supply and take-up reels, in symmetrical fashion for bidirectional operation. For most high performance machines, these low inertia compliance mechanisms take the form of vacuum chambers, in which the tape forms the loop under pressure differential, so that the tape may be fed to and withdrawn from the loop at the varying rates of speed for any instant by the associated reel and the driving mechanism. With this system, the driving mechanism need only overcome the inertia of the tape itself, plus the friction of the associated guide elements and the tension of the tape, and the relatively bulky and high interia reel can operate at a slower rate in more convenient fashion. A signal is usually derived representative of the length of the loop in the vacuum chamber and entered into a servo system which controls the reel motor, which thereafter supplies tape to or withdraws tape from the vacuum chamber so as to tend to keep the loop within the chamber at a constant length.

These prior art reel servo systems, however, have suffered from a number of disadvantages. The generation of an analog signal representative of the length of the tape loop in the vacuum chamber is essentially a complex measurement which requires complex structure to obtain an accurate reading. For full control of motor speeds through a wide range, it is necessary to utilize signals in the servo system to control relatively large motors, which in turn requires large amounts of amplifier power and which makes the system relatively insentitive to small changes. The use of a large motor also dictates that the power usage will be relatively inefficient under most circumstances.

As greater demands are placed on the capability of the system for operating uniformly in a wide variety of modes, and as more stringent requirements are placed on start, stop, and reversal times, further deficiences in the prior art systems appear. In such systems, the tape loop within a chamber tends to drift between limits during operation. When a complete reversal of tape movement is to take place at a high rate of speed, it may therefore be initiated at a time at which the servo system is least capable of accommodating that type of a change. If tape is being withdrawn from a chamber, for example, the tape with such systems may drift outwardly to form a longer loop. At this point, there may occur a reversal command which requires that the tape be fed into the chamber. Under these circumstances, the reel motor may not reverse and take up tape sufficiently fast to account for the tape which is fed in, so that the tape loop may pass across the vacuum inlet, causing a loss of control of the loop and possible tape breakage.

While these problems encountered have been described in relation to high performance tape transports using vacuum chamber loops, many of these problems as well as the solutions pointed out hereinafter are applicable to any transport system for driving elongated flexible materials, such as webs and paper tapes.

It is therefore an object of the present invention to provide an improved servo system for controlling systems for advancing elongated flexible materials, such as tape transports.

Yet another object of the present invention is to provide an improved system for controlling the operation of low inertia compliance mechanisms in magnetic tape and other systems which are arranged for bidirectional and intermittent operation.

A further object of the present invention is to provide a more stable, less costly reel servo control system for tape transports utilizing vacuum chambers or other low inertia compliance mechanisms.

It is a still further object of this invention to provide a servo control system for tape transports capable of maintaining the tape loops in the proper condition for rapid reversal of tape direction.

Systems in accordance with the present invention utilize sensing of the mode of operation, tape speed and tape position to derive positive control of the loop placement in a simple and efficient manner. In an example of a system in accordance with the invention, a signal for the control of the reel servo motor is generated by summing signals representative of tape speed, tape direction, and tape position, the tape position signals being derived from at least two points representative of different loop lengths.

In accordance with the mode of operation, the servo system tends to maintain the tape moving at a length such that it oscillates about a specific one of the position points, the point selected being that required for maximum capability of immediately reverting to the opposite mode of operation. In one specific arrangement, the tachometer signal generated from a roller guide at the entrance to the vacuum chamber is summed together with the actuator signal to provide a tape speed which tends to draw the loop toward the selected point. The position of the tape relative to the sensing point does not control an analog device but effectively controls a switching device which has a predominating effect in the servo system. For alternate opposite movements of the tape across the sensing point, the switching device speeds the servo motor up and slows it down, at a high rate of speed, thus effecting a net speed variation which tends to make the tape appear constant at a central region of the sensing point. This type of control results in high responsiveness to small errors and excellent speed control, as well as absolute control of the placement of the tape.

Another feature of systems in accordance with the present invention is the use of a technique for an alternative placement of the tape loops for extremely high performance operation, or for additional control. In this arrangement, additional position holes are utilized in the vacuum chamber, with the position holes being paired to maintain the loop within a selected range when in the standstill condition. No matter where the loop lengths are when the tape is stopped they will be moved to intermediate positions so that they have adequate length for starting in either direction.

A better understanding of the invention may be had by reference to the following description, taken in conjunction with the accompanying drawings, in which.

Figure 1:
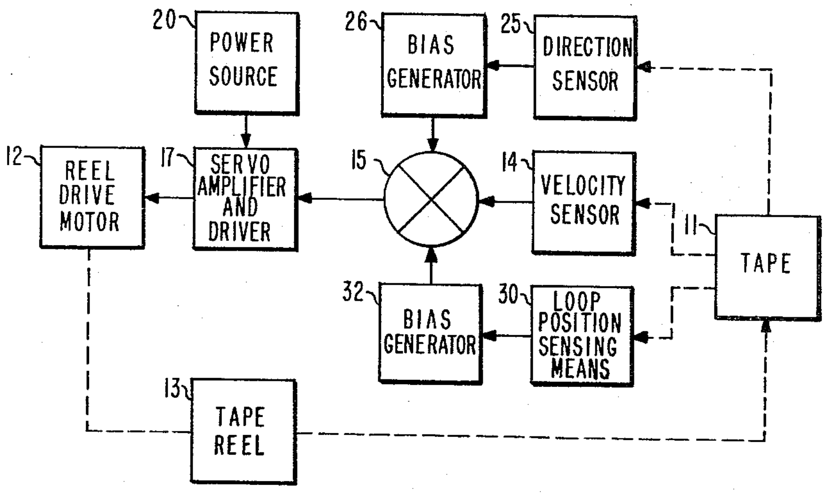
FIG. 1 is a block diagram illustrating the basic operation of the device of the invention.
Figure 2:
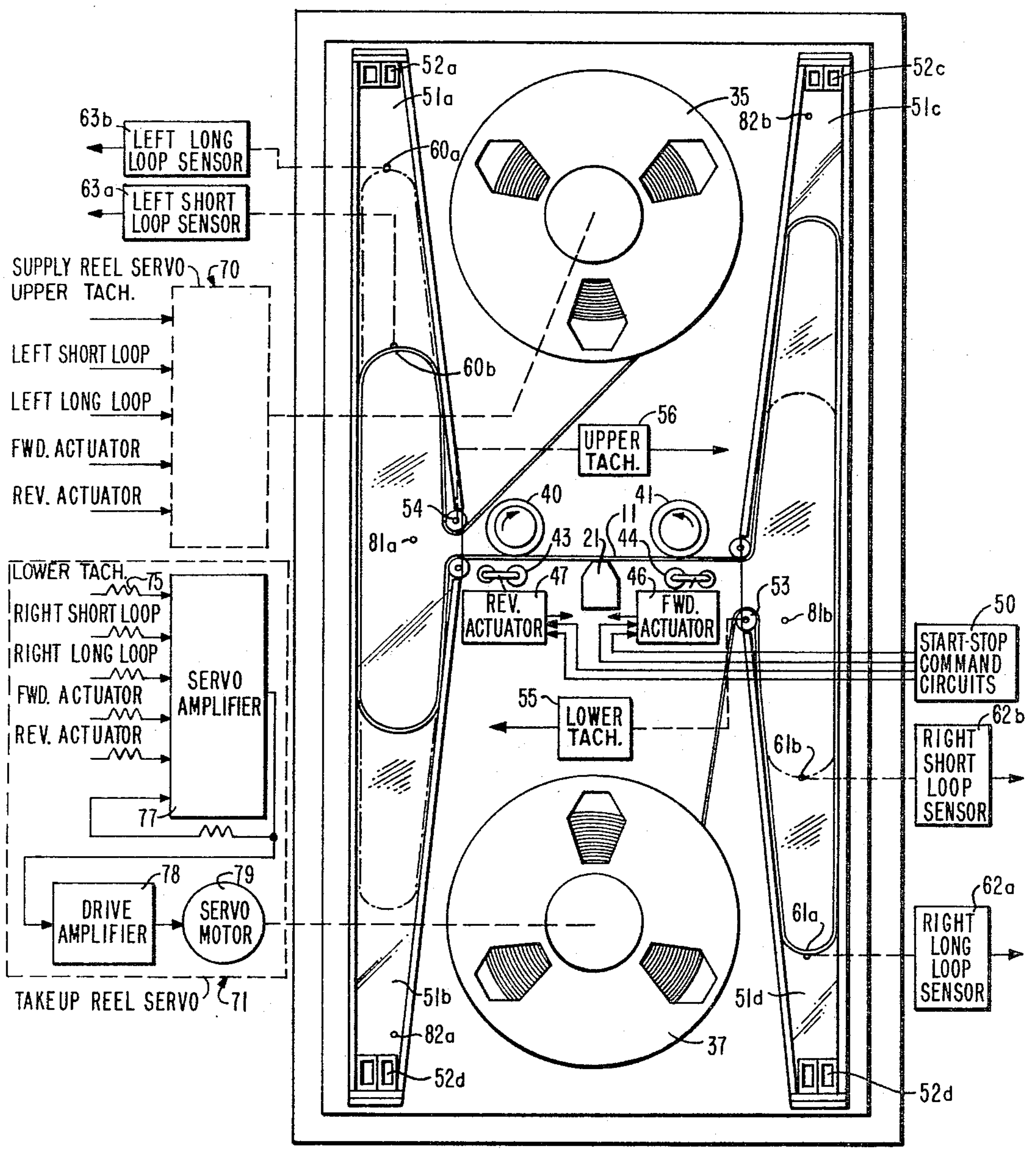
FIG. 2 is a combined schematic and block diagram representation of a first embodiment of the device of the invention.

Referring to FIG. 1, the basic operation of the device of the invention is illustrated. The tape 11 is driven by means of a reel drive motor 12 which drives a tape reel 13 in conventional fashion. The tape is appropriately looped, as illustrated in FIG. 2, by low inertia compliance mechanisms adjacent to both the supply and take-up reels.

The velocity at which the tape is traveling into the chamber from the supply reel is sensed by a velocity sensor 14 which may comprise a tachometer. The output of the velocity sensor 14 is fed as an appropriately scaled negative feedback signal to a summing device 15. The output of the summing device 15 is fed as part of the control signal to a servo amplifier and driver 17, which operates in conjunction with its power source 20 to provide the drive power for the reel drive motor 12. An increase in the velocity of the tape 11 as sensed by the velocity sensor 14 causes a decrease in the output of servo amplifier 17 and a corresponding decrease in the rotation speed of reel drive motor 12 and vice versa. Thus, the negative feedback signal supplied from the velocity sensor 14 tends to maintain the rotation speed of the reel drive motor 12 and the velocity of the tape 11 at the value determined by the bias inputs to the servo amplifier 17.

The direction sensor 25 has an output signal which is indicative of the direction of motion of tape 11. This signal may be developed in various ways. One means may include a three position switch having a shorted switch contact between the bias generator 26 and a voltage source of one polarity for one direction of motion, an open switch contact for the static condition, and another switch contact connecting the bias generator 26 to a source of the other polarity for the opposite direction of motion. A second means may include a pair of two position switches connected to the bias generator 26, both being open when the tape 11 is stationary and an appropriate one of the two being closed when the tape moves in one or the other direction. The bias generator 26 produces a bias voltage output which is fed to the summing device 15 and is indicative of the direction of travel of the tape 11. Thus, the bias generator 26 may supply an output signal of a first predetermined magnitude for one direction of tape travel and an output signal of a second predetermined magnitude for tape travel in the opposite direction. The input signal to the servo amplifier 17 is thus one value for one direction of tape motion and another value which may be equal but of opposite polarity for the opposite direction of tape motion.

As to be explained in connection with FIG. 2, the bias signals produced by bias generator 26 with the tape going in the "forward" direction are predetermined so that the supply reel feeds tape slower than it is being taken out of the chamber by the capstan. This tends to shorten the loop adjacent to the supply reel (as indicated by the solid line in FIG. 2.

Tape loop position sensing means 30 is positioned so that it detects the arrival of the tape loop at a predetermined point. The output of tape loop position sensing means 30 is fed to bias generator 32, the output of bias generator 32 being fed via summing device 15 to the input of servo amplifier 17. When the tape is on one side of tape loop sensing means 30, the sensing means has an output signal which causes bias generator 32 to have a first predetermined output signal. When the tape is on the opposite side of sensing means 30, bias generator 32 is made to have a second predetermined output signal.

The output of bias generator 32 for one predetermined positional relationship of the tape loop to tape loop sensing means 30, for example, with the tape loop on one side thereof, is such as to bias servo amplifier 17 to lower the drive signal to reel drive motor 12. The output of the bias generator for a second positional relationship between the tape and the sensing means, for example, with the tape loop on the other side of the sensing means, is such as to raise the drive signal to motor 12. The servo, as to be shown, causes the tape loop to come to the position of position sensing means 30 and then to remain substantially thereat.

To illustrate how this is achieved, it may be assumed that direction sensor 25 produces an output causing bias generator 26 to produce an input signal to servo amplifier 17 such as to slow down reel drive motor 12. Assuming that reel drive motor 12 is driving the tape feed reel, this tends to cause the tape to be drawn up from the vacuum chamber supply faster than it is being fed into the vacuum chamber supply. As a result, the tape loop adjacent the feed reel is shortened. Assuming that the tape loop position sensing means 30 is positioned at a point of desired short loop length, the tape loop eventually arrives at the position sensing means. When it crosses to the other side of the sensing means 30, the sensing means starts producing an output signal which causes the bias generator 32 to feed a higher drive signal to servo amplifier 17. This speeds up drive motor 12, thereby increasing the rotation speed of the tape feed reel. The tape loop consequently lengthens until the position sensing means is again crossed. When this position is reached, the reel drive motor 12 again resumes rotation at a more rapid rotational speed again bringing the tape loop to the shortened position. The tape loop thus oscillates about the tape loop position sensing means 30, substantially maintaining this position.

Figure 3:
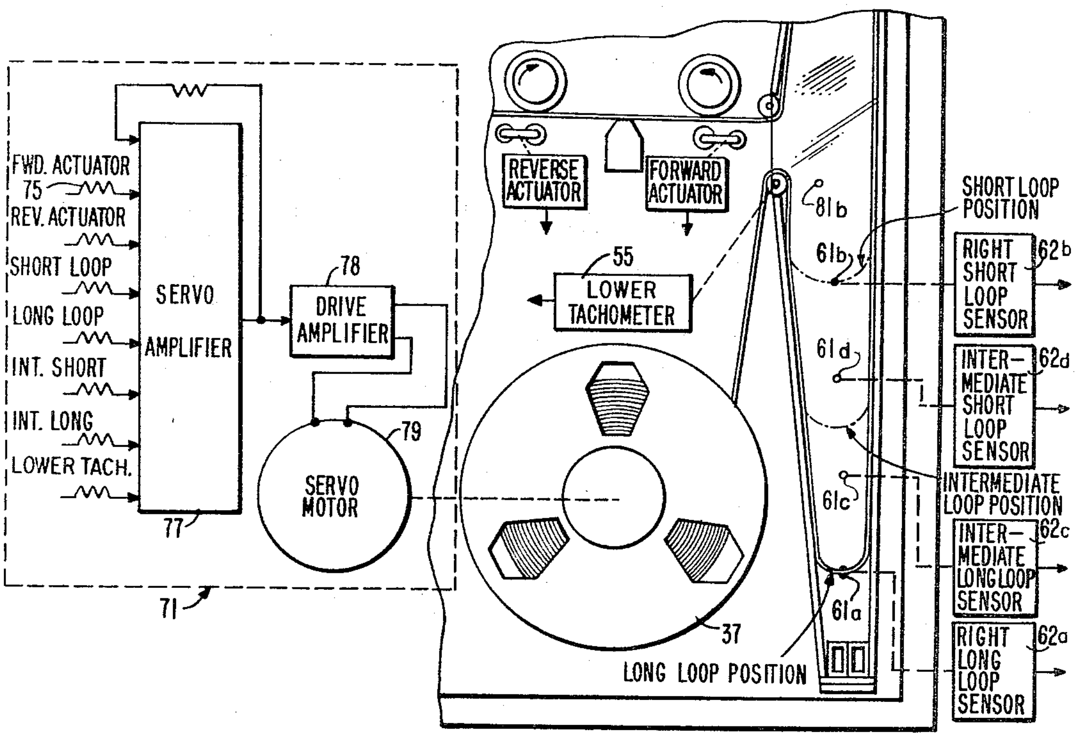
FIG. 3 is a combined block diagram and simplified schematic of a second embodiment of the device of the invention.

As to be noted in connection with FIGS. 2 and 3, such servo control is utilized to maintain one of the tape loops in the shortened condition and the other of the loops in the lengthened condition depending upon whether the reels are running forward or in reverse.

The elevation view of FIG. 2 shows, in schematic and block diagram form, the principal elements of a first embodiment of the device of the invention. Principal functional elements are of course the magnetic tape 11 and the magnetic head assembly 21, the tape being provided from a supply reel 35 to a take-up reel 37, these designations being used for convenience even though it should be understood that the tape is to be driven bidirectionally with data transfer taking place in either direction of tape movement. Elements conventionally used in such transport mechanisms, but not essential to the description of the present invention, have not been shown in detail. Thus, the signal recording and reproducing circuits coupled to the magnetic head assembly 21 have not been shown. Similarly, conventional elements for which a number of alternate expedients are known have either been omitted or have been shown in block diagram form.

For a high performance magnetic tape transport, the transport system is of the type utilizing a pair of counter-rotating capstans 40 and 41 positioned on opposite sides of the magnetic head assembly. Pivotally mounted pinch roller actuator mechanisms 43 and 44 are disposed on opposite sides of the tape from each of the capstans, the pinch rollers being separately urged against the associated capstans by different coupled actuators 46 or 47. Thus, depending upon which actuator 43 or 44 is engaged, the tape is urged into driving contact with a given one of the capstans 40 or 41, respectively, and an intermittent, high speed, bidirectional operation may be achieved. The associated data processing system (not shown) may provide the start and stop signals by means of command circuits 50 to control the operation of the two actuator mechanisms 43 and 44, which are designated the reverse and forward actuators respectively, although it will be understod that these directions of movement are arbitrarily selected for ease of reference and description of the system.

The high speed intermittent movement of the tape 11 at the capstans is considerably in excess of the response speed which can be achieved with the relatively high mass, high inertia supply and take-up reels 35 and 37. Therefore, an integral part of the system is a low inertia compliance mechanism, such as the double ended vacuum chambers **51*a*–51*d*** shown at the two sides of the transport.

The double ended vacuum chamber configuration, each chamber having a central region at which the tape is fed and withdrawn, provides a compact means of forming a low inertia tape loop as a buffer between the high speed capstan and the associated reel mechanisms. Vacuum ports **52*a*–52*d*** are positioned within the chambers adacent each end thereof and coupled to a vacuum source such as provided, for example, by a vacuum pump (not shown).

At the exit end of each chamber, which is here defined as the closest point of the chamber along the tape path to the associated and adjacent reel, the tape passes in constant engagement with a low friction guide roller 53 and 54 to which is coupled a tachometer 55 and 56 respectively, the two tachometers being designated lower and upper in accordance with their association with the lower and upper reels 37 and 35 and their associated right and left hand chambers (as viewed in the figures).

A feature of the present invention is the use of a pair of position sensing holes **60*a*, 60*b*, and 61*a*, 61*b* in the chamber walls, at selected loop length positions from the central region of each chamber. These position sensing holes are accordingly designated as the short loop 60*b*, 61*b* and long loop 60*a*, 61*a* sensing holes for the right and left chambers, and each is coupled to an associated pressure sensitive switch 62*a*, 62*b*, 63*a* and 63*b*** which is designated as the corresponding loop sensor.

It will be recognized by those skilled in the art that in accordance with the conventional operation of a vacuum or other pressure chamber for forming a tape loop, a pressure differential exists across the tape between the pressure at the vacuum port at the end of the chamber and the atmosphere or selected ambient pressure in the central region of the chamber. Accordingly, if the tape loop is not interposed between a sensing hole and the vacuum port the pressure at the hole is low, whereas once the loop extends to pass between the vacuum port and the sensing hole, the sensing hole pressure materially increases, being coupled to atmosphere. In accordance with the present invention, this binary limit sensing arrangement is utilized in a combination which effects the equivalent of proportional control of the tape loop by operation of the servo motor for the associated reel 35 or 37.

The supply reel servo 70 and the take-up reel servo 71 are essentially alike, and only one has been shown in detail, it being understood that the specific expedients which are used may be in any of a number of forms and that a detailed description is not necessary for those skilled in the art. For example, the coupling between the servo and the associated reel has been indicated only in idealized form, and braking elements which may be used have not been illustrated. The supply reel servo 70 receives signals from the upper tachometer, from the left short loop sensor, the left long loop sensor, the forward actuator and the reverse actuator whereas the take-up reel servo 71 receives signals from the lower tachometer, the right short loop sensor, the right long loop sensor, the forward and the reverse actuator.

Referring specifically to the detailed elements shown in conjunction with the take-up reel servo 71, the signals are provided through an appropriate summing resistor network 75 to the servo amplifier 77, which includes a negative feedback coupling from the output of the amplifier to its input. The summation of the various input signals to the servo amplifier accordingly results in the generation of an error signal which is applied to a drive amplifier 78, the output signal from which controls the servo motor 79 which is connected to the take-up reel 37. The input signals provided to the supply reel servo 70 are similarly utilized.

With this arrangement, the basic control of tape loop length in a chamber, i.e. the principal signal used for tape loop control, is the velocity representative signal derived from the tachometer 55 or 56. The velocity servo operation is further controlled, however, by the lesser amplitude but steady state signals derived from the forward and reverse actuators 46 and 47 through the appropriately scaled summing network 75. Assuming first for purposes of explanation that the loop length is somewhere between the short loop and long loop position holes upon change from one direction of movement to another, the result is that the tape loop tends to lengthen or shorten depending upon the direction of movement of the tape. This shortening and lengthening effect is selected to provide the optimum storage capability for changing from that particular direction of tape movement to the opposite. If the tape is being moved forward, for example, or into the right hand chamber, the most critical change of command which can occur is to have an immediate reversal of direction at high speed. Therefore, it is most desirable that the loop lengths in the right hand vacuum chamber **51*c*–51*d* be at the long loop position. Concurrently, the tape 11** is being withdrawn from the left hand chamber, and the optimum position is at the short loop location, to protect against sudden and complete reversal of direction at high speed.

This much of this servo system therefore tends to bias the loop lengths towards the optimum positions for reversing from a given operating mode. The input signals derived from the position sensing holes additionally contribute steady state components to the signals being provided to the servo amplifier, which steady state components oppositely affect the error signal dependent upon the position of the loop length relative to the sensing hole. The long and short loop sensors are effectively switches, and therefore have no intermediate, non-operated position. Thus, when the loop is above the long loop position hole 61*a* for the forward direction of movement in the right hand chamber 51*c*–51*d*, the contribution of the right long loop sensor is in effect subtracted from the other signal contributions so that an outward movement of the loop results because the take-up reel motor 79 is driven slower than the tape is fed into the chamber. Once the long loop positioning hole is passed by the loop, however, the new component derived from the right long loop sensor 62*a* is added to the other components, thereby increasing the speed of the reel motor 79 so as to withdraw tape from the chamber faster than the rate at which it is fed in. Thus in this mode of operation in the right hand chamber, the tape merely oscillates in controlled fashion about the long loop position hole, being driven alternately outwardly and then inwardly.

This arrangement has a number of particular advantages. Firstly, as pointed out above, it assures positive control of loop placement at an optimum position for a given operating mode. Therefore, it permits a reduction in the length of the vacuum chamber, increases the freedom of the system's designer as to program restrictions which must be observed in an extremely high performance machine, and uses only relatively simple linear or digital operating elements. There is no need to utilize expensive analog transducers to sense the length of the loop in the chamber, for example, because the basic velocity signal is derived from the tachometer in conjunction with the actuator signal. The differential pressure sensors at the position holes may be of relatively simple and highly reliable construction. Another important advantage is derived from the fact that this relatively simple system does not provide a dead space in the servo function, so that the reel is never coasting and therefore solely affected by tape tension. Instead, for a given direction of tape movement the reel rotates either at a speed at which the loop travels outwardly or inwardly in the chamber, but the loop is always under positive control.

In a practical system in accordance with the invention, for operation with one inch magnetic tape at a nominal tape velocity of 133 inches per second, the position holes are placed in dependence upon the response of the servo system at approximately five and one-half inches apart and symmetrically placed with respect to distance between the short and long loop malfunction sensor holes 81*a*, 81*b* and 82*a*, 82*b*, respectively, located in each chamber in the long portion 51*b* or 51*d* opposite that portion containing the long position sensing holes 60*a*–60*b* and 61*a*–61*b*. These malfunction sensing holes 81*a*, 81*b* and 82*a* and 82*b* are connected, in the well known manner, with pressure sensitive switches (not shown) to disable the tape transport before the loop is either entirely withdrawn from the chamber or reaches one of the vacuum ports.

In a typical system in accordance with the invention, operating at a speed of 133 inches per second, the cumulative voltage derived from the servo amplifier is selected to vary the speed of the associated reel motor approximately 10% greater and 10% less than the selected nominal tape velocity of 133 inches per second. This is determined by the voltage derived from the tachometer, the actuator and the sensing hole signals in accordance with the above considerations. It will be appreciated by those skilled in the art that where it is not desired to change the program mode arbitrarily, and where lower speeds of operation are desired, the vacuum chamber may in accordance with the present invention be greatly decreased in size. Namely, the position sensing holes may be moved closer together and the lengths of vacuum chamber extending on both sides of the position sensing holes for the given half of a chamber may be greatly reduced. Conversely, where it is desired to operate with a servo having a slower response, this system affords the designer the option of placing the sensing holes further apart so as to provide this physical means of compensating for the response in a given overall system. It will also be appreciated by those skilled in the art that the double ended vacuum chamber configuration used herein need not be employed but that the concepts of the invention may be applied to conventional single ended vacuum chambers as well as other compliance mechanisms.

Where it is desired to increase the performance capability of a given tape transport machine, the basic configuration of the system of FIG. 2 may be further supplemented by the use of additional hole sensing inputs to control the position of the loop in the chamber during the standby mode, that is, while the tape is not being driven in either the forward or reverse mode but is stopped awaiting the next start command. In the arrangement of FIG. 3, only a portion of the system concerned with a given one of the chambers is shown, it being understood that similar considerations apply to the other half of the chamber shown, and to the opposite chamber of the system. In this arrangement, intermediate sensing holes 61*c* and 61*d* are disposed between the short loop sensing position hole 61*b* and the long loop position hole 61*a*, these being referred to as the intermediate short loop position hole 61*d* and the intermediate long loop position hole 61*c*, respectively. These intermediate position sensing holes 61*c* and 61*d* are symmetrically placed on either side of the center point between the short and long loop position sensing holes 61*a* and 61*b*. Output signals derived from these sensors are summed in a pair of resistors in the resistor network 75 forming the input to the servo amplifier 77, to provide low level signals having substantially no effect upon the maintenance of the short loops and long loops at the appropriate position holes when the tape is being driven in either direction. These relatively small amplitude signals, however, are effectively used in control of the tape loop when the actuators 46 and 47 are off during the standby mode.

With both actuators 46 and 47 turned off and the tape stopped, the system of FIG. 3 is in balance only if the tape loop is somewhere between the intermediate short loop position hole and the intermediate long loop position hole. To achieve balance, the signals from the two intermediate sensors 62*c* and 62*d* are sufficient to provide a controlled turning of the servo motor until the loop is shortened, or lengthened as the case may be to an appropriate intermediate position between the two intermediate sensors 62*c* and 62*d*. At this point the servo system enters its dead region in which the reels are held stationary.

This arrangement permits further increases in performance, because it provides safeguards against the possibility of the tape 11 being stopped in the short loop position, for example, and then being started again in the same direction to withdraw tape from the chamber. With the arrangement of FIG. 2, the short loop position sensing hole 60*b* or 61*b* is placed far enough from the central region of the chamber with regard to the servo response so that the tape loop is not withdrawn from the chamber regardless of any normal sequence of commands. In the arrangement of FIG. 3, however, the short loop position hole 61*b* may be moved closer to the central region, and the long loop position hole 61*a* may be moved further toward the closed end of the chamber, inasmuch as the system seeks to bring the tape to the intermediate region between the two intermediate position holes 61*c* and 61*d* whenever the tape 11 is stopped. This arrangement increases the efficiency with which the vacuum chambers are used and thereby permits a reduction in the power requirements of the servo motors, and also reduces the heating of the motors and minimizes the restrictions on the servo system.

While there have been described above and illustrated in the drawings various forms of low inertia buffering systems for magnetic tape and other web transport mechanisms, it will be appreciated that a number of alternatives and other variations are also possible. Accordingly, the invention should be considered to include all modifications falling within the scope of the appended claims.

What is claimed is:

1. In a tape transport system including vacuum chambers providing low inertia tape loops in the tape path between the storage reels and the tape driving mechanism, a servo system for maintaining a predetermined loop position comprising means for sensing the length of the tape loop and providing a bilevel position signal indicative of the length relative to the predetermined loop position, servo means for driving said tape at a speed in accordance with the magnitude of a driving signal, tachometer means providing a signal proportional to the velocity of the tape, means for providing a command signal representing the direction of tape travel, and signal adder means for algebraically combining said command signal, said position signal, and said velocity signal to provide a driving signal to the servo means for varying the tape speeds to maintain the desired tape length oscillating under positive control at the predetermined loop position.

2. In a tape transport system, a servo system for maintaining a desired tape loop length within a vacuum chamber comprising tape sensing means disposed at predetermined positions within the vacuum chamber for sensing the position of the tape loop relative to said predetermined positions and providing bilevel position signals having a polarity indicative thereof, driving means coupled to the tape at one end of the loop for driving that end of the tape at a first speed, servo means at the other end of the loop for driving the other end of the tape loop at a second speed proportional to the magnitude of a driving signal, means providing a bilevel command signal representing the direction of travel of the tape at said driving means, means providing a signal representing the velocity of the tape at the servo means, and adder means for algebraically combining said command signal, said velocity signal and said position signal to provide the driving signal to the servo means to drive the tape at the other end of the tape loop at the second speed different from said first speed to change the length of the tape loop relative to one predetermined position and to hold the tape loop in oscillation relative to another predetermined position.

3. In a tape transport system, a servo system for maintaining a predetermined tape loop position within a vacuum chamber comprising tape loop sensing means including a pressure sensing hole and a pressure sensing switch responsive to the pressure at the position of the sensing hole, a two polarity voltage source connected to the pressure sensitive switch for providing a bilevel first signal having a polarity indicative of the tape loop position relative to the position of the sensing hole, a first tape driving means at one end of the tape loop for driving the tape at a selected nominal speed when actuated, means responsive to the actuation of the first driving means for providing a second signal having a polarity indicating the direction of travel of the tape at the one end of the tape loop, means providing a third signal representing the speed of the tape at the other end of the tape loop, and second tape driving means for providing a tape speed at the other end of the tape loop proportional to the algebraic sum of the first, second and third signals whereby the tape loop is maintained in oscillation about the pressure sensing hole.

4. A servo system for maintaining a flexible material in a given loop configuration while being driven in a longitudinal direction comprising means for sensing the length of the loop relative to a predetermined length and providing a first two-level output signal having a first level when the loop length is greater than the predetermined length and a second level when the tape loop is less than the predetermined length, driving means for driving the flexible material on one end of the tape loop at a speed proportional to the magnitude of an input signal, means for providing a second output signal having a polarity indicating the direction of travel of the tape at the other end of the tape loop, means for providing a third output signal having a magnitude representative of the speed of the tape at the one end of the tape loop, and adder means for algebraically combining said first, second and third output signals to provide the input signal to said driving means whereby the length of the tape loop oscillates about the predetermined length.

5. A servo system for controlling a loop length of flexible material between two points while the flexible material is being driven longitudinally comprising means for driving the flexible material at a first speed past a first of the two points, variable speed driving means responsive to the magnitude of an applied signal for driving the tape in the same direction past a second of the two points, loop sensing means responsive to the position of the flexible material in the loop while providing a bilevel output signal representative of the loop length between the two points, tachometer means for sensing the speed of the material at the second of the two points and providing a second signal representative of the speed sensed, means for providing a third signal representative of the direction of travel of the tape at said first point, and means for applying to the variable speed drive means a signal representative of the algebraic sum of the first, second and third signals, the applied signal representative of the sum having one of two values, one value being above and the other being below the value of the applied signal necessary to drive a flexible material at the first speed whereby the loop length varies in oscillating fashion about a desired loop length.

6. A system for maintaining maximum dynamic tape loop storage within a vacuum chamber of a tape transport system located on one side of a tape driving means comprising first and second tape loop sensing means, said first tape loop sensing means being positioned to sense a larger tape loop than said second tape loop sensing means, each of said first and second tape loop sensing means including means for providing a bilevel position signal representative of the position of the tape loop relative thereto, means for sensing the direction of tape travel and providing a bilevel signal representative thereof, means for providing a velocity signal representative of tape velocity adjacent the vacuum chamber, and servo means responsive to the algebraic sum of the bilevel position signals, the direction signal and the velocity signal for maintaining the tape loop in oscillation about one of two positions as determined by the positions of the first and second tape loop sensing means, the larger loop being maintained by the first tape loop sensing means when the direction of tape travel is from the tape driving means into the vacuum chamber and a smaller tape loop being maintained by the second tape loop sensing means when the direction of tape travel is out of the vacuum chamber towards the tape driving sensing means, whereby maximum dynamic tape storage is provided.

7. A tape transport system for providing maximum tape storage by means of tape loops comprising two low inertia compliance means for forming at least a pair of tape loops, tape loop sensing means disposed at three distinct positions within the low inertia compliance means, each loop sensing means including associated means for providing a bilevel position signal representative of the location of the tape loop relative to the associated loop sensing means, means for providing a bilevel signal representative of the direction of tape travel between the two low inertia compliance means, means for providing a signal representing the velocity of the tape, servo means responsive to a driving signal for maintaining the tape loop at one of the three distinct positions providing loops of different lengths, one of the three positions providing a tape loop length intermediate the lengths provided by the other two positions, signal means for algebraically combining the position signals, direction signal and velocity signal to provide the driving signal to the servo means to maintain the tape in oscillation about a large loop position at one low inertia compliance means and in oscillation about a small loop position at the other low inertia compliance means while the tape is being driven therebetween, the large loop position being maintained at the low inertia compliance means toward which the tape is being driven, and standby means responsive to the position signals to maintain the tape loop at one of the three positions providing intermediate tape loop length at both the low inertia compliance means when the tape is not moving therebetween.

8. In a tape transport servo system for driving a tape between two reels, said tape having looped portions associated with each reel, motor means for driving the tape, amplifier means for providing a drive signal for said motor means, means for generating a bilevel signal in accordance with the direction of travel of said tape, means for generating a signal in accordance with the velocity of travel of said tape, means for generating a signal in accordance with the velocity of travel of said tape, loop position sensing means associated with each of said looped tape portions for generating a first predetermined signal when the associated loop is on one side of said sensing means and a second predetermined signal when the loop is on the other side of said sensing means, and means for summing said signals in accordance with velocity and direction of said tape and selected outputs of said loop sensing means, the output of said summing means being fed to said amplifier means, whereby said looped portions are maintained in oscillation about predetermined positions depending on the direction of travel of the tape.

9. In a servo system for a tape transport, means for maintaining predetermined optimum tape loops between supply and take-up reels comprising servo amplifier means for providing a reel drive signal, means for providing a signal in accordance with the direction of travel of the tape as a control input to said amplifier, means for providing a signal in accordance with the velocity of travel of said tape as a control input to said amplifier, and loop position sensing means for providing a first signal when the tape loop is on one side of a predetermined point and a second signal when the tape loop is on the other side of said predetermined point, said first and second signals being fed as control inputs to said amplifier whereby the tape loop is held in oscillation about said predetermined point.

10. In a servo system for a tape transport mechanism, said transport system being adapted to transfer tape between relatively high inertia reels, means for maintaining a buffer loop in the tape comprising servo means for driving said reels, vacuum chamber means for forming said buffer loop, at least a pair of sensing elements disposed at different points in said vacuum chamber means to define predetermined different loop lengths, each of said sensing means having one predetermined output when the tape loop is one side thereof and another predetermined output when the tape loop is on the other side thereof, means for sensing the direction of travel of said tape, and means for sensing the velocity of travel of said tape, the outputs of said sensing elements, said means for sensing direction and said means for sensing velocity being fed as control inputs to said servo means, whereby said tape loops are maintained in oscillation about the position of one of said sensing elements in accordance with the direction of travel of said tape.

11. A system for providing low inertia lengths of flexible material on either side of a driving means for moving the flexible material bidirectionally comprising a pair of low inertia compliance mechanisms each having an open end for receiving a portion of the flexible material within to form a loop, a pair of loop sensing means within each low inertia compliance mechanism, a first one of said pair of loop sensing means being positioned remote from the open end and a second one of said pair of loop sensing means being positioned adjacent the open end, each of said loop sensing means including means for providing a position signal of fixed amplitude and having one polarity when the flexible material is on the opposite side of the associated sensing means from the open end and an opposite polarity when the flexible material is on the same side of the associated sensing means as the open end, means for providing a pair of direction signals representative of the direction of travel of the flexible material at the driving means, each of the direction signals being associated with a respective one of the compliance mechanisms and having a polarity like said one polarity of the position signals when the flexible material is being driven in the direction from the driving means to the associated compliance mechanism and a polarity like said opposite polarity of the position signals when the flexible material is being driven in a direction from the associated compliance mechanism to the driving means, means for providing a pair of velocity signals representative of the velocity of the flexible material on the opposite sides of the loops from the driving means, and servo means responsive to the position signals, the direction signals and the velocity signals for maintaining the loops in oscillation about the first loop sensing means in one compliance mechanism and in oscillation about the second loop sensing means in the other compliance mechanism.

References Cited by the Examiner

UNITED STATES PATENTS

| | | | |
|---|---|---|---|
| 2,921,753 | 1/1960 | Lahiti et al. | 242—55.12 |
| 2,952,415 | 9/1960 | Gilson | 242—55.12 |
| 3,074,661 | 1/1963 | Brumbaugh et al. | 242—55.12 |
| 3,137,453 | 6/1964 | Wooldridge | 242—55.12 |

OTHER REFERENCES

IBM Technical Disclosure Bulletin, vol. 1, No. 5, February 1959, p. 24, "Tape Reel Drive Control," R. J. Kochenburger.

FRANK J. COHEN, *Primary Examiner.*

G. F. MAUTZ, *Examiner.*